US008568895B2

(12) United States Patent
Kharazipour et al.

(10) Patent No.: US 8,568,895 B2
(45) **Date of Patent: *Oct. 29, 2013**

(54) USE OF POPCORN FOR TIMBER AND COMPOSITE MATERIALS

(75) Inventors: Alireza Kharazipour, Gottingen (DE); Christian Bohn, Bismark (DE)

(73) Assignee: Georg-August-Universitat Gottingen Stiftung Offentlichen Rechts, Gottingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,131

(22) Filed: Apr. 13, 2012

(65) Prior Publication Data

US 2012/0196120 A1 Aug. 2, 2012

Related U.S. Application Data

(63) Continuation of application No. 12/444,513, filed as application No. PCT/EP2007/060485 on Oct. 2, 2007, now Pat. No. 8,168,303.

(30) Foreign Application Priority Data

Oct. 4, 2006 (DE) ......................... 10 2006 047 279

(51) Int. Cl.
*B32B 23/04* (2006.01)

(52) U.S. Cl.
USPC ........ 428/532; 428/535; 428/536; 428/537.1; 427/394; 427/392; 427/393; 427/396; 427/397; 427/408

(58) Field of Classification Search
USPC ...................... 428/532, 535, 536, 537.1, 402; 427/392, 393, 394, 396, 397, 408
See application file for complete search history.

(56) References Cited

U.S. PATENT DOCUMENTS

| | | | | |
|---|---|---|---|---|
| 3,965,051 | A | 6/1976 | Markusch et al. | |
| 4,992,519 | A | 2/1991 | Mukherjee | |
| 5,300,333 | A * | 4/1994 | Wilkerson et al. | 428/35.6 |
| 5,773,801 | A * | 6/1998 | Blamer et al. | 219/727 |
| 8,168,303 | B2 * | 5/2012 | Kharazipour et al. | 428/532 |
| 2002/0197383 | A1 | 12/2002 | Amos | |

FOREIGN PATENT DOCUMENTS

| | | | |
|---|---|---|---|
| EP | 1318000 | | 6/2003 |
| GB | 2366853 | * | 3/2002 |
| JP | 05329810 | * | 12/1993 |

* cited by examiner

*Primary Examiner* — Leszek Kiliman

(74) *Attorney, Agent, or Firm* — Occhiuti Rohlicek & Tsao LLP

(57) ABSTRACT

The present invention relates to the use of popcorn as material that provides structure and that stabilizes dimensions, for lignocellulose-containing molded articles, such as wood/composite materials, and also to the use of popcorn as binder for formaldehyde in wood/composite materials.

15 Claims, 2 Drawing Sheets

USE OF POPCORN FOR TIMBER AND COMPOSITE MATERIALS

CROSS-REFERENCE TO RELATED APPLICATIONS

Figure 1:
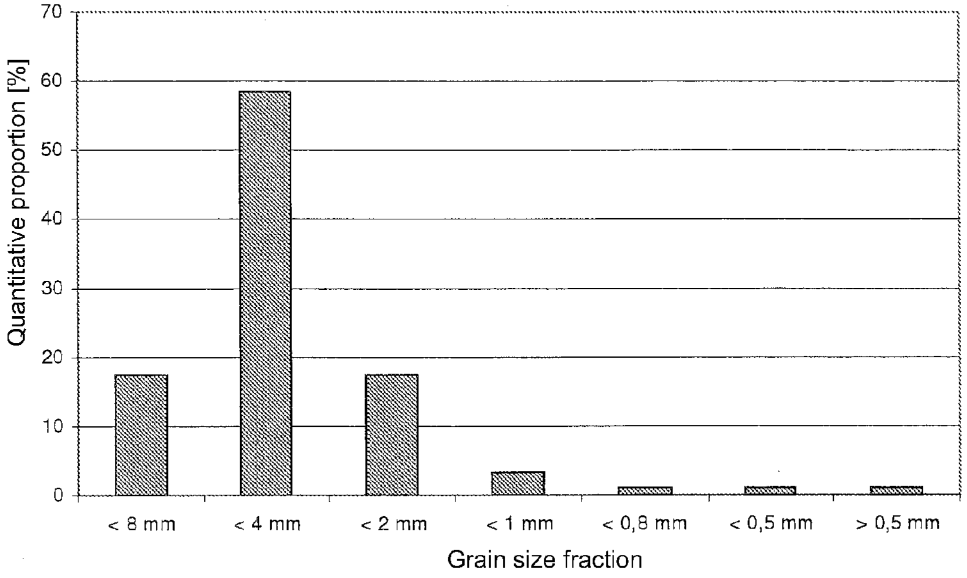

This is a continuation of application Ser. No. 12/444,513, filed on Apr. 6, 2009, now U.S. Pat. No. 8,168,303, which was the National Stage of International Application No. PCT/EP2007/060485, filed on Oct. 2, 2007, which claims the priority of German Application No. 102006047279.9, filed on Oct. 4, 2006. The contents of all the above-mentioned applications are hereby incorporated by reference in their entirety.

The present invention relates to the sector of wood/composite materials, in particular of chipboards and fibreboards, and also to composite materials in which lignocellulose and popcorn are present.

Wood/composite materials, in particular chipboards or fibreboards, have now been known for more than 100 years as substitute for solid timber in the furniture industry, the building trade, etc. There are a plurality of factors here influencing the quality of wood/composite materials, and among these in particular are bulk density, transverse tensile strength and thickness swelling.

Bulk density in particular is extremely important for wood/composite materials, since the level of advantageous properties of a chipboard or fibreboard, for example the strength properties, mostly increases as bulk density increases. However, wood/composite materials of low bulk density would be advantageous, since such wood/composite materials would require less lignocellulose and binder, and these could be transported at lower cost. There is also a wide range of possible uses for such composite materials with low bulk density, requiring a less dense (and therefore less heavy) material.

However, the intention is that there be minimum impairment of the advantageous properties associated with increasing bulk density, or indeed that these be retained.

An object is therefore to provide a wood/composite material in which low bulk density can be achieved together with good other properties, such as tensile strength and/or thickness swelling.

This object is achieved via a wood/composite material according to claim 1. Accordingly, a lignocellulose-containing molded article is proposed, in particular a wood/composite material, such as a chipboard and/or fibreboard, where the lignocellulose-containing molded article comprises popcorn as material that provides structure and/or that stabilizes dimensions.

Surprisingly, it has been found that admixture of popcorn in wood/composite materials can lower bulk density in many applications within the present invention, while there is no impairment of the advantageous properties of the wood/composite material, and indeed in some applications within the present invention these can even be improved.

The expression "lignocellulose-containing molded article" in particular covers any of the sheet-like and non-sheet-like materials which comprise, as main constituent, comminuted lignocellulose-containing materials, e.g. wood, cereal straw, hemp or flax, and which are subjected to a pressure process with exposure to heat and pressure, after application of a glue, in the form of a binder which comes from synthetic sources or from substantially natural sources.

The expression "wood/composite material" in particular means materials which are mainly composed of mechanically or thermomechanically comminuted lignocellulose-containing material, and which are subjected to pressing with exposure to heat and pressure, after application of a glue, in the form of a binder which comes from synthetic sources or from substantially natural sources, to give wood/composite materials.

However, according to one preferred embodiment, the wood/composite material can be composed of 100% of popcorn. For the purposes of the present invention, the expression "wood/composite material" is intended to be understood in its widest sense and expressly to include those materials composed (only) of popcorn and comprising no (remaining) timber constituents.

For the purposes of the present invention, the expression "popcorn" in particular encompasses all of the materials which, like popcorn grains (*Zea mays*, convar. Microsperma)—if appropriate after appropriate treatment with fat, explode when rapidly heated to high temperatures, because the water present in the seed evaporates suddenly and thus converts the starch present in the seed to a consistency similar to that of foam. This type of behaviour is known, inter alia, from quinoa grains, amaranth, rice or wheat, and materials based on these raw materials are explicitly also encompassed and termed "popcorn" for the purposes of the present invention, the intention being that the expression "popcorn" be not restricted to grains alone, the selection of this expression having been made in particular for reasons of simplicity and to make the text easy to read and comprehend.

The expression "material that provides structure and that stabilizes dimensions" in particular means here any material which on the basis of its structure gives the material a certain strength and dimensional stability.

The proportion of the popcorn in the lignocellulose-containing molded article here can be from >0 to ≤100% of the material that provides structure and/or that stabilizes dimensions.

For the purposes of the present invention, therefore, an inventive lignocellulose-containing molded article can also be composed of 100% of popcorn; the intention is that the expression "lignocellulose-containing molded article" be understood in the widest possible sense and that it explicitly also encompass those molded articles which are composed in essence or entirely of popcorn.

According to one preferred embodiment of the invention, the grain size distribution of the popcorn is such that the grain size of ≥50% and ≤90% of the popcorn is ≥2 mm and ≤10 mm.

This has proven advantageous for many applications within the present invention. Popcorn of greater grain size is often more difficult to process to give lignocellulose-containing molded articles, such as wood/composite materials, and popcorn of smaller grain size has a tendency, in many applications within the present inventions, to absorb the glue or, respectively, the binder added during production of the wood/composite material, and this can impair the quality of the wood/composite material.

It is particularly preferable that the grain size distribution of the popcorn is such that the grain size of ≥70% and ≤90% of the popcorn is ≥2 mm and ≤10 mm.

According to one preferred embodiment of the invention, the grain size distribution of the popcorn is such that the grain size of ≥50% and ≤90%, particularly preferably ≥70% and ≤90%, of the popcorn is ≥4 mm and ≤10 mm.

According to one preferred embodiment of the invention, the grain size distribution of the popcorn is such that the grain size of ≥50% and ≤80% of the popcorn is ≥3 mm and ≤8 mm.

According to one preferred embodiment of the invention, the average grain size distribution of the popcorn is ≥3 mm and ≤6 mm. This has proven advantageous for many applications within the present invention.

It is particularly preferable that the average grain size distribution of the popcorn is ≥3.5 mm and ≤5 mm.

According to one preferred embodiment of the invention, the fat content of the popcorn prior to processing is ≤10% (by weight).

The "fat content" of the popcorn here is not the total content of fat in the popcorn but the content of fat which has been used for seed-epidermis hydro-phobicization, which leads to better enclosure of the water present in the seed.

In many applications within the present invention, it has proven advantageous to keep this fat content as low as possible, since this makes further processing of the popcorn easier. Fat content is preferably ≤5% (by weight), and in one particularly preferred embodiment no fat is added for consistency change (conversion) (="puffing"). In this case it is particularly preferable that the consistency change (="puffing") takes place by means of microwaves, as will be described below.

The present invention furthermore provides the use of popcorn as formaldehyde scavenger, in particular in, but not restricted to, wood/composite materials which have been bonded with urea-formaldehyde resin, with melamine-formaldehyde resin, with melamine-reinforced urea-formaldehyde resin, with tannin-formaldehyde resin and with phenol-formaldehyde resin or with a mixture composed of the resins mentioned.

Surprisingly, it has been found that popcorn cannot only be used as a material that provides structure and that stabilizes dimensions in lignocellulose-containing molded articles, such as wood/composite materials, but also has the advantageous property of functioning as formaldehyde scavenger in the sheet during production and during use of wood/composite materials.

The proportion of the popcorn in the wood/composite material here can be from ≥0 to ≤100% of the material that provides structure and that stabilizes dimensions.

According to one preferred embodiment of the invention, the grain size distribution of the popcorn is such that the grain size of ≥50% and ≤90%, of the popcorn is ≥2 mm and ≤10 mm.

This has proven advantageous for many applications within the present invention. Popcorn of greater grain size is often more difficult to process to give wood/composite materials, and popcorn of smaller grain size has a tendency, in many applications within the present invention, to absorb the glue or, respectively, the binder added during production of the wood/composite material, and this can impair the quality of the wood/composite material.

It is particularly preferable that the grain size distribution of the popcorn is such that the grain size of ≥70% and ≤90% of the popcorn is ≥2 mm and ≤10 mm.

According to one preferred embodiment of the invention, the grain size distribution of the popcorn is such that the grain size of ≥50% and ≤90%, particularly preferably ≥70% and ≤90%, of the popcorn is ≥4 mm and ≤10 mm.

According to one preferred embodiment of the invention, the grain size distribution of the popcorn is such that the grain size of ≥50% and ≤80% of the popcorn is ≥3 mm and ≤8 mm.

According to one preferred embodiment of the invention, the average grain size distribution of the popcorn is ≥3 mm and ≤6 mm. This has proven advantageous for many applications within the present invention.

It is particularly preferable that the average grain size distribution of the popcorn is ≥3.5 mm and ≤5 mm.

According to one preferred embodiment of the invention, the fat content of the popcorn prior to processing is ≤10% (by weight).

The "fat content" of the popcorn here is not the total content of fat in the popcorn but the content of fat which has been added to convert the grains grains to popcorn (=puffing).

In many applications within the present invention, it has proven advantageous to keep this fat content as low as possible, since this makes further processing of the popcorn easier. Fat content is preferably ≤5% (by weight), and in one particularly preferred embodiment no fat is added for consistency change (conversion) (="puffing"). In this case it is particularly preferable that the consistency change (="puffing") takes place by means of microwaves, as will be described below.

The present invention further provides a chipboard and/or fibreboard with bulk density of ≤550 $kg/m^3$, more preferably ≤500 $kg/m^3$, and most preferably ≤450 $kg/m^3$, and with transverse tensile strength per unit of bulk density *1000 of ≥0.75 $m^3N/mm^2$ kg, preferably ≥0.8 $m^3$ $N/mm^2$ kg, and most preferably ≥0.85 $m^3N/mm^2$ kg.

The present invention further relates to a process for production of an inventive wood/composite material and/or of an inventive chipboard and/or fibreboard, comprising the steps of a) treatment of popcorn grains so as to give popped up popcorn
b) milling of the popcorn
c) production of the wood/composite material or of the chipboard and/or fibreboard.

According to one preferred embodiment of the invention, step a) is carried out via microwave treatment, preferably at ≥1500 W and ≤3000 W, the treatment time preferably being from ≥1 min to ≤5 min.

According to one preferred embodiment of the invention, in step c), a binder and, if appropriate, a hardening accelerator is added.

In principle, any of the binders known in the field can be used here, examples being urea-formaldehyde resin, melamine-formaldehyde resin, melamine-reinforced urea-formaldehyde resin, tannin-formaldehyde resin, phenol-formaldehyde resin and polymeric diphenylmethane diisocyanates. The hardening accelerators used can comprise any of the substances known in the field, in particular ammonium sulphate and/or potash.

There are no particular exceptional conditions applying to the size of, or shape of, or material selection for, or technical design of, the abovementioned, or the claimed, components to be used according to the invention, or those described in the inventive examples, and the selection criteria known in the application sector can therefore be applied without restriction.

Figure 2:
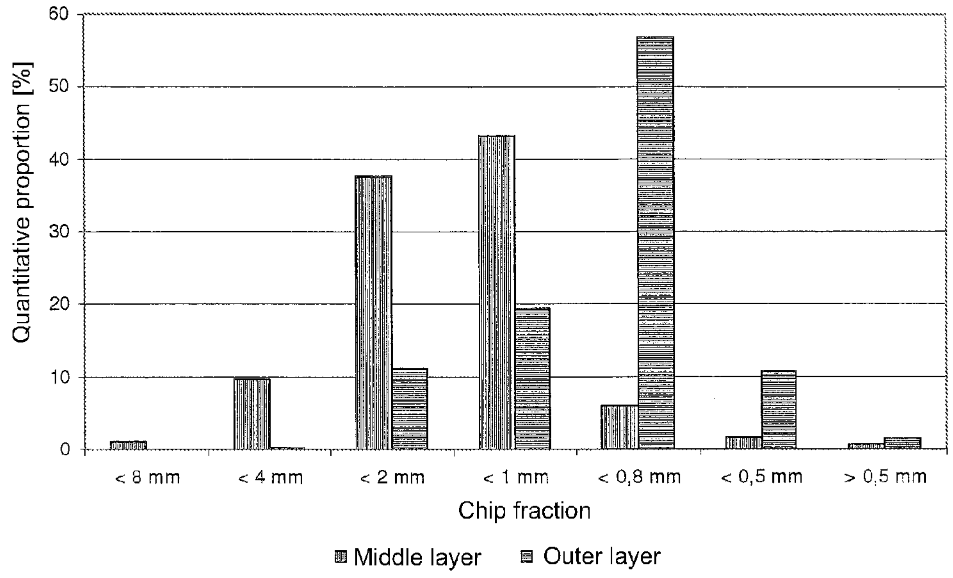

Further details, features and advantages of the subject matter of the invention are apparent from the subclaims and from the description below of the relevant examples and drawings, which present—by way of example—a plurality of inventive examples of lignocellulose-containing molded articles. In the drawings, which relate to the examples:

FIG. 1 shows a diagram of grain size distribution popcorn grains used in the inventive examples; and FIG. 2 shows a diagram of a chip fraction distribution of middle- and outer-layer chips which were used in the inventive examples.

PRODUCTION OF POPCORN GRAINS

All of the following examples according to the invention were carried out using popcorn which was produced in the following way:

The popcorn was produced by placing popcorn grains in a paper bag and heating it for 2 min. at 2000 W in an industrial microwave. The resultant popcorn was comminuted into fragments of size about 5 mm with the aid of a Rätsch mill, and then used for production of timber materials. The material was separated into different fractions as a function of use of the popcorn grains in the outer or middle layer. The sieved grains were separated in a ratio of 60% to 40% for the middle and outer layer. FIG. 1 shows the grain size distribution of the grains.

Production of Woodchips

All of the examples which comprise woodchips (whether inventive or comparative examples) were carried out using woodchips produced as follows:

Industrially treated chip material was used for production of all of the chipboards. The chips were taken from the belt weigher after drying and immediately prior to glue application. The material is composed of various raw material, subdivided into outer- and middle-layer fraction as required by the process. FIG. 2 shows the size distribution of the woodchips used.

EXAMPLE 1

Production of UF-resin-bound, Three-layer Chipboards with Low Bulk Density and with 50% of Popcorn Grains in the Middle Layer Industrially produced chip material and popcorn grains were used to produce three-layer chipboards of thickness 20 mm with bulk density of 450 kg/m$^3$ and 550 kg/m$^3$, using an industrially standardized binder composition. 50% of popcorn grains were admixed with the middle-layer chips. The binder used comprised an aqueous solution of a urea-formaldehyde condensate with trade mark "KAURIT® 350 liquid" from BASF AG with about 68% solids content. The hardening accelerator used comprised a 33 percent strength aqueous ammonium sulphate solution. The hydrophobicizer used comprised an emulsion based on paraffin with trade mark "HYDROWAX 138®" from SASOL GmbH, with solids content of about 50%. The glue liquor of the middle layer here was composed of 8.5% of solid UF resin, based on anhydrous chip, 1% of ammonium sulphate solution (hardener), based on anhydrous solid resin, and 1% of hydrophobicizer, based on anhydrous chip. The glue liquor of the outer layer was composed of 10% of solid UF resin, based on anhydrous chip, 0.5% of ammonium sulphate solution, based on anhydrous solid resin, and 1% of hydrophobicizer, based on anhydrous chip. The chip mass was subjected to pressing at 195° C. for 12 s/mm at a pressure of 220 bar.

The transverse tensile strengths of the chipboards using popcorn grains in the middle layer and having bulk density of 550 kg/m$^3$ are 0.45 N/mm$^2$, not only above the references but also above the standard prescribed by EN 312-4. The swelling values for the popcorn chipboards after 24 h of storage in water are 8.3%, also below the respective values for the reference sheets and below the 15% standard (see Table 1).

EXAMPLE 2

Production of UF-resin-bound, Three-layer Chipboards with Low Bulk Density and Using 50% of Popcorn Grains in the Middle Layer and Outer Layer Industrially produced chip material and popcorn grains were used to produce three-layer chipboards of thickness 20 mm with bulk density of 450 kg/m$^3$ and 550 kg/m$^3$, using an industrially standardized binder composition. In this example, 50% of popcorn grains were admixed not only with the middle layer but also with the chip material for the outer layer. The binder used again comprised "KAURIT® 350 liquid" UF resin from BASF AG. The hardening accelerator used comprised an ammonium sulphate solution. The hydrophobicizer used comprised the paraffin "HYDROWAX 138®" from SASOL GmbH. The glue liquor of the middle layer here was composed of 8.5% of solid resin, based on anhydrous chip, 1% of ammonium sulphate solution, based on anhydrous solid resin, and 1% of hydrophobicizer, based on anhydrous chip. The glue liquor of the outer layer was composed of 10% of solid resin, based on anhydrous chip, 0.5% of ammonium sulphate solution, based on anhydrous solid resin, and 1% of hydrophobicizer, based on anhydrous chip. The chip mass was subjected to pressing at 195° C. for 12 s/mm at a pressure of 220 bar (see Table 1).

EXAMPLE 3

Production of UF-resin-bound, Three-layer Chipboards with Low Bulk Density Purely from Industrial Chips, as Reference Three-layer chipboards with bulk density of 450 kg/m$^3$ and 550 kg/m$^3$ and with an industrially standardized binder composition were produced purely from industrially produced chip product. The constitution and amount of the glue liquor corresponded to that described in Example 1 and 2. All of the other production parameters are completely identical with Example 1 and 2. The values for the mechanical and technological properties of Examples 1, 2 and 3 are shown in Table 1.

TABLE 1

Mechanical and technological properties of the three-layer, UF-resin-bound chipboards with popcorn admixture in the middle layer (Example 1), in the middle layer and outer layer (Example 2) and using purely industrial chips, as reference (Example 3)

| Title | Bulk density [kg/m$^3$] | Transverse tensile strength [N/mm$^2$] | 2 h swelling [%] | 24 h swelling [%] |
|---|---|---|---|---|
| Example 1 | 550 | 0.45 | 1.72 | 8.34 |
| Example 1 | 450 | 0.35 | 1.40 | 7.40 |
| Example 2 | 550 | 0.48 | 1.68 | 8.12 |
| Example 2 | 450 | 0.36 | 1.50 | 7.54 |
| Example 3 (reference) | 550 | 0.30 | 8.89 | 16.28 |
| Example 3 (reference) | 450 | 0.26 | 7.82 | 15.66 |

EXAMPLE 4

Production of PF-resin-bound, Three-layer Chipboards with Low Bulk Density and Using 50% of Popcorn Grains in the Middle Layer Three-layer chipboards of thickness 20 mm with bulk density of 450 kg/m$^3$ and 550 kg/m$^3$ were produced using phenolic resin as binder, from the same chip product and popcorn grains. Again, 50% of popcorn grains were admixed with the middle-layer chips. The binder used for the outer layer comprised an aqueous solution of a phenol-formaldehyde resin with trade mark "Bakelite® PF 2506 HW" from Bakelite AG with solids content of about 45%. The middle layer used "Bakelite® PF 1842 HW" PF resin with solids content of about 48%. The hardening accelerator used comprised a 50 percent strength aqueous potash solution. The hydrophobicizer used comprised an emulsion based on paraffin with trade mark "HYDROWAX 138®" from SASOL GmbH, with solids content of about 50%. The glue liquor of the middle layer here was composed of 8.5% of solid PF resin, based on anhydrous chip, 2% of potash solution (hardener), based on anhydrous solid resin, and 1% of hydrophobicizer, based on anhydrous chip. The glue liquor of the outer layer was composed of 10% of solid PF resin, based on anhydrous chip, 1% of potash solution (hardener), based on anhydrous solid resin, and 1% of hydrophobicizer, based on anhydrous chip. The chip mass was subjected to pressing at 210° C. for 12 s/mm at a pressure of 220 bar (see Table 2).

EXAMPLE 5

Production of Pf-resin-bound, Three-layer Chipboards with Low Bulk Density and Using 50% of Popcorn Grains in the Middle Layer and Outer Layer Three-layer chipboards of thickness 20 mm with bulk density of 450 kg/m$^3$ and 550 kg/m$^3$ were produced using phenolic resin as binder, from the same chip product and popcorn grains. Again, 50% of popcorn grains were admixed with the middle-layer chips and outer-layer chips. The binder used for the outer layer comprised an aqueous solution of a phenol-formaldehyde resin with trade mark "Bakelite® PF 2506 HW" from Bakelite AG with solids content of about 45%. The middle layer used "Bakelite® PF 1842 HW" PF resin with solids content of about 48%. The hardening accelerator used comprised a 50 percent strength aqueous potash solution. The hydrophobicizer used comprised an emulsion based on paraffin with trade mark "HYDROWAX 138®" from SASOL GmbH, with solids content of about 50%. The glue liquor of the middle layer here was composed of 8.5% of solid resin, based on anhydrous chip, 2% of potash solution, based on anhydrous solid resin, and 1% of hydrophobicizer, based on anhydrous chip. The glue liquor of the outer layer was composed of 10% of solid resin, based on anhydrous chip, 1% of potash solution, based on anhydrous solid resin, and 1% of hydrophobicizer, based on anhydrous chip. The chip mass was subjected to pressing at 210° C. for 12 s/mm at a pressure of 220 bar (see Table 2).

EXAMPLE 6

Production of Pf-resin-bound, Three-layer Chipboards with Low Bulk Density Purely from Industrial Chips, as Reference Three-layer chipboards with bulk density of 450 kg/m$^3$ and 550 kg/m$^3$ and with an industrially standardized binder composition were produced purely from industrially produced chip product. The constitution and amount of the glue liquor corresponded to that described in Example 4 and 5. All of the other production parameters are completely identical with Example 4 and 5. The values for the mechanical and technological properties of Examples 4, 5 and 6 are shown in Table 2.

TABLE 2

Mechanical and technological properties of the three-layer, PF-resin-bound chipboards with popcorn admixture in the middle layer (Example 4), in the middle layer and outer layer (Example 5) and using purely industrial chips, as reference (Example 6)

| Title | Bulk density [kg/m$^3$] | Transverse tensile strength [N/mm$^2$] | 2 h swelling [%] | 24 h swelling [%] |
|---|---|---|---|---|
| Example 4 | 550 | 0.54 | 1.56 | 9.26 |
| Example 4 | 450 | 0.38 | 1.46 | 7.89 |
| Example 5 | 550 | 0.58 | 1.60 | 9.21 |
| Example 5 | 450 | 0.41 | 1.42 | 7.58 |
| Example 6 (reference) | 550 | 0.34 | 7.82 | 14.56 |
| Example 6 (reference) | 450 | 0.28 | 7.28 | 13.68 |

EXAMPLE 7

Production of PMDI-bound, Three-layer Chipboards with Low Bulk Density and Using 50% of Popcorn Grains in the Middle Layer Three-layer chipboards of thickness 20 mm with bulk density of 450 kg/m$^3$ and 550 kg/m$^3$ were produced from industrially produced chip product and popcorn grains and polymeric diphenylmethane diisocyanate (PMDI) as binder. 50% of popcorn grains were admixed with the middle-layer chips. The binder used comprised "Desmodur 1520 A20" polymeric diphenylmethane diisocyanate from BAYER AG. No additives or hydrophobicizers were added at all. The glue applied to the outer-layer chip material and middle-layer chip material comprised 3%, based on anhydrous chip, of PMDI. The chip mass was then subjected to pressing at 210° C. for 12 s/mm at a pressure of 220 mbar (see Table 3).

EXAMPLE 8

Production of PMDI-bound, Three-layer Chipboards with Low Bulk Density and Using 50% of Popcorn Grains in the Middle Layer and Outer Layer Three-layer chipboards of thickness 20 mm with bulk density of 450 kg/m$^3$ and 550 kg/m$^3$ were produced from industrially produced chip product and popcorn grains and polymeric diphenylmethane diisocyanate as binder. 50% of popcorn grains were admixed with the middle-layer chips and outer-layer chips. The binder used comprised "Desmodur 1520 A20" polymeric diphenylmethane diisocyanate from BAYER AG. No additives or hydrophobicizers were added at all. The glue applied to the outer-layer chip material and middle-layer chip material comprised 3%, based on anhydrous chip, of PMDI. The chip mass was then subjected to pressing at 210° C. for 12 s/mm at a pressure of 220 mbar.

EXAMPLE 9

Production of PMDI-bound, Three-layer Chipboards with Low Bulk Density Purely from Industrial Chips, as Reference As reference with respect to Example 5, three-layer chipboards of thickness 20 mm with bulk density of 450 kg/m$^3$ and 550 kg/m$^3$, using "Desmodur 1520 A20" PMDI as binder were produced purely from industrially produced chip product. All of the other production parameters are completely identical with Example 7 and 8. The values for mechanical and technological properties for Examples 7, 8 and 9 are shown in Table 3.

TABLE 3

Mechanical and technological properties of the three-layer, PMDI-resin-bound chipboards with popcorn admixture in the middle layer (Example 7), in the middle layer and outer layer (Example 8) and using purely industrial chips, as reference (Example 9)

| Title | Bulk density [kg/m$^3$] | Transverse tensile strength [N/mm$^2$] | 2 h swelling [%] | 24 h swelling [%] |
|---|---|---|---|---|
| Example 7 | 550 | 0.60 | 6.34 | 13.45 |
| Example 7 | 450 | 0.51 | 7.71 | 14.29 |
| Example 8 | 550 | 0.64 | 5.98 | 13.21 |
| Example 8 | 450 | 0.55 | 7.59 | 13.86 |
| Example 9 (reference) | 550 | 0.39 | 7.25 | 15.91 |
| Example 9 (reference) | 450 | 0.33 | 8.96 | 18.73 |

EXAMPLE 10

Production of UF-resin-bound, Three-layer Composite Materials with Low Bulk Density from 100% of Popcorn Grains in the Middle Layer and Outer Layer Popcorn grains were used to produce three-layer composite materials of thickness 20 mm with bulk density of 450 kg/m$^3$ and 550 kg/m$^3$, using an industrially standardized binder composition. The binder used comprised an aqueous solution of a urea-formaldehyde condensate with trade mark "KAURIT® 350 liquid" from BASF AG with solids content of about 68%. The hardening accelerator used comprised a 33 percent strength aqueous ammonium sulphate solution. The hydrophobicizer used comprised an emulsion based on paraffin with trade mark "HYDROWAX 138®" from SASOL GmbH, with solids content of about 50%. The glue liquor of the middle layer here was composed of 8.5% of solid UF resin, based on anhydrous popcorn grains, 1% of ammonium sulphate solution (hardener), based on anhydrous solid resin, and 1% of hydrophobicizer, based on anhydrous popcorn grains. The glue liquor of the outer layer was composed of 10% of solid UF resin, based on anhydrous popcorn grains, 0.5% of ammonium sulphate solution, based on anhydrous solid resin, and 1% of hydrophobicizer, based on anhydrous popcorn grains. The popcorn mass was subjected to pressing at 195° C. for 12 s/mm at a pressure of 220 bar.

The perforator value, i.e. formaldehyde liberation, was also measured in Example 10 (for method see below). As can be clearly seen, this perforator value is markedly lower for the inventive composite materials, i.e. less formaldehyde is liberated, since it is bound by the popcorn.

TABLE 4

Mechanical and technological properties of the three-layer composite materials composed of popcorn grains bound with UF resin (Example 10) and the corresponding reference (Example 3) composed of woodchips

| Title | Bulk density [kg/m$^3$] | Transverse tensile strength [N/mm$^2$] | 2 h swelling [%] | 24 h swelling [%] | Perforator value [mg/100 g] |
|---|---|---|---|---|---|
| Example 10 | 550 | 0.47 | 0.57 | 6.32 | 2.04 |
| Example 10 | 450 | 0.33 | 0.32 | 5.92 | 1.76 |
| Example 3 (reference) | 550 | 0.30 | 8.89 | 16.28 | 6.59 |
| Example 3 (reference) | 450 | 0.26 | 7.82 | 15.66 | 6.85 |

EXAMPLE 11

Production of Phenolic-resin-(PF)-bound, Three-layer Composite Materials With Low Bulk Density from 100% of Popcorn Grains in the Middle Layer and Outer Layer The same popcorn grains were used to produce three-layer composite materials of thickness 20 mm, with bulk density of 450 kg/m$^3$ and 550 kg/m$^3$, using phenolic resin as binder. The binder used for the outer layer comprised an aqueous solution of a phenol-formaldehyde resin with trade mark "Bakelite@ PF 2506 HW" from Bakelite AG with solids content of about 45%. The middle layer used "Bakelite® PF 1842 HW" PF resin with solids content of about 48%. The hardening accelerator used comprised a 50 percent strength aqueous potash solution (hardener). The hydrophobicizer used comprised an emulsion based on paraffin with trade mark "HYDROWAX 138®" from SASOL GmbH, with solids content of about 50%. The glue liquor of the middle layer here was composed of 8.5% of solid PF resin, based on anhydrous popcorn grains, 2% of potash solution (hardener), based on anhydrous solid resin, and 1% of hydrophobicizer, based on anhydrous popcorn grains. The glue liquor of the outer layer was composed of 10% of solid PF resin, based on anhydrous popcorn grains, 1% of potash solution (hardener), based on anhydrous solid resin, and 1% of hydrophobicizer, based on anhydrous popcorn grains. The popcorn grain mass was subjected to pressing at 210° C. for 12 s/mm at a pressure of 220 bar.

A perforator value was likewise measured; here again, the values are markedly lower than for the comparative composite materials.

TABLE 5

Mechanical and technological properties of the three-layer composite materials composed of popcorn grains bound with PF resin (Example 11) and the corresponding reference (Example 6) composed of woodchips

| Title | Bulk density [kg/m$^3$] | Transverse tensile strength [N/mm$^2$] | 2 h swelling [%] | 24 h swelling [%] | Perforator value [mg/100 g] |
|---|---|---|---|---|---|
| Example 11 | 550 | 0.52 | 0.81 | 7.44 | 1.61 |
| Example 11 | 450 | 0.45 | 0.54 | 7.98 | 1.68 |
| Example 6 (reference) | 550 | 0.34 | 7.82 | 14.56 | 5.98 |
| Example 6 (reference) | 450 | 0.28 | 7.28 | 13.68 | 6.06 |

The transverse tensile strengths of the composite materials composed purely of popcorn grains and with bulk density of 550 kg/m$^3$ are 0.47 N/mm$^2$ to 0.64 N/mm$^2$, not only above the references but also above the standard prescribed by EN 312-4. The swelling values for the popcorn composite materials after 24 h of storage in water, about 6%, are also below the respective values for the reference sheets, and markedly below the standard of 15%.

The extremely low perforator values, from 1.6 to 2 mg of formaldehyde per 100 g of composite material for PF-resin- and UF-resin-bound sheets, are also remarkable. Here, values for UF-resin-bound composite materials composed of wood are generally from 6 to 7 mg/100 g. EN 120 prescribes an upper limit of 7 mg/100 g for the perforator value.

EXAMPLE 12

Production of PMDI-bound, Three-layer Composite Materials with Low Bulk Density from 100% of Popcorn Grains in the Middle and Outer Layer Popcorn grains and polymeric diphenylmethane diisocyanate (PMDI) as binder were used to produce three-layer composite materials of thickness 20 mm, with bulk density of 450 kg/m$^3$ and 550 kg/m$^3$. The binder used comprised "Desmodur 1520 A20" polymeric diphenylmethane diisocyanate from BAYER AG. Additives and hydrophobicizers were entirely omitted. The glue applied to the outer layer material and middle layer material comprised 3%, based on anhydrous popcorn grains, of PMDI. The popcorn grain mass was then subjected to pressing at 210° C. for 12 s/mm at a pressure of 220 bar.

A perforator value was likewise measured; here again, the values are markedly lower than for the comparative composite materials.

TABLE 6

Mechanical and technological properties of the three-layer composite materials composed of popcorn grains bound with PMDI (Example 12) and the corresponding reference (Example 9) composed of woodchips

| Title | Bulk density [kg/m$^3$] | Transverse tensile strength [N/mm$^2$] | 2 h swelling [%] | 24 h swelling [%] | Perforator value [mg/100 g] |
|---|---|---|---|---|---|
| Example 12 | 550 | 0.64 | 0.32 | 6.71 | 0.18 |
| Example 12 | 450 | 0.47 | 0.43 | 7.73 | 0.12 |
| Example 9 (reference) | 550 | 0.39 | 7.25 | 15.91 | 0.58 |
| Example 9 (reference) | 450 | 0.33 | 8.96 | 18.73 | 0.55 |

Determination of Formaldehyde Release

Method:

Determination of Formaldehyde Release from Timber Materials by the Bottle Method One method used for determination of formaldehyde release from timber materials was the bottle method known from the prior art. For this, test specimens with edge length 25 mm were taken from the sheets to be tested and a number (mostly three test specimens) corresponding to ~20 g were suspended by means of two rubber bands in a polyethylene bottle (WKI bottle) of capacity 500 ml, in which 50 ml of deionized water had previously been placed. For determination of the blind value, a WKI bottle comprising no test specimens was added to each series of tests. The securely sealed WKI bottles were then placed for three hours in a heating cabinet set to 40° C.

After expiry of the test time, the WKI bottles were opened, and the test specimens were removed. The bottles were then again sealed. In order to achieve complete absorption of the formaldehyde in the water, the WKI bottles were allowed to cool for one hour. This was followed by photometric determination on the absorption solution, to find the amount of formaldehyde released.

Determination of Formaldehyde Release from Timber Materials by the Perforator Method Formaldehyde release was also determined by the perforator method. The perforator method (DIN EN 120) is a test standard for determination of unbound formaldehyde in uncoated and/or unpainted timber materials. For the extraction process, about 100 g of test specimens with edge length 25 mm are placed in the round-bottomed flask of the perforator apparatus. After addition of 600 ml of toluene, the round-bottomed flask is attached to the perforator and then 1000 ml of distilled water are charged to the perforator input. The cooler apparatus and gas-absorption apparatus, and also the collector flask of the gas-absorption apparatus, are then attached. About 100 ml of distilled water are placed in the collector flask in order to trap any escaping formaldehyde. Finally, the cooling system and the heating system are switched on. The perforation procedure begins when toluene begins to flow back through the siphon tube. Extraction of formaldehyde from the material continues for exactly two hours from this juncture, and it is essential here that return of toluene is continuous. After expiry of the two hours, the heating system is switched off, and the gas-absorption apparatus is removed. Once the water in the perforator apparatus has cooled to room temperature, it is charged by way of an outlet tap to a volumetric flask of capacity 2000 ml. The perforator is washed twice, on each occasion using 200 ml of distilled water. The washing water is charged, with the water in the collector flask, to the volumetric flask. Distilled water is then used to fill the volumetric flask to the 2000 ml level. The absorption solution was then used for photometric determination of the amount of formaldehyde released.

Photometric Determination of Formaldehyde Release

Formaldehyde release was determined according to the instructions in EN 717-3. 10 ml of the absorption solution were pipetted into a bottle with ground-glass stopper and 10 ml of a 0.04M acetylacetone solution and 10 ml of a 20% strength ammonium acetate solution were admixed. The specimens were then incubated in a shaker water bath for 15 minutes at 40° C. After one hour of cooling to room temperature while the specimens were stored in the dark, they were tested photometrically at 412 nm against deionized water, and the amount of formaldehyde released from the specimens was calculated as mg of formaldehyde release, based on kg of dry weight of the specimen, for the WKI bottle value. The perforator value is stated in mg of formaldehyde, based on 100 g of dry weight of the specimen.

Measurement of Formaldehyde Release for Three Inventive Examples and One Comparative Example Table 7 contain the results for formaldehyde release from popcorn-containing composite materials, determined by the bottle method and by the perforator method. For conventional timber materials, the bottle value in mg of HCHO/1000 g, and the perforator value in mg of HCHO/100 g are approximately comparable. As can be seen from Table 1, the trend between the two values is the same for all of the examples listed. The perforator value is slightly below the WKI bottle value for all of the specimens. These results therefore confirm the formaldehyde-binding properties of the popcorn.

TABLE 7

Formaldehyde release by the bottle method and perforator method from popcorn-containing composite materials (Examples 1 and 2), from a reference sheet (Example 3), and from composite materials composed purely of popcorn (Example 10)

| | WKI bottle value (mg/1000 g) | Perforator value (mg/100 g) |
|---|---|---|
| Example 1 | 3.79 | 2.36 |
| Example 2 | 3.14 | 2.08 |
| Example 3 (reference) | 8.45 | 6.59 |
| Example 10 | 2.58 | 2.04 |

The invention claimed is:

1. A composite fiberboard material, comprising popcorn fragments and wood fibers, wherein ≥50% of the popcorn fragments have a size of ≥2 mm and ≤10 mm.

2. The composite fiberboard material of claim 1, wherein ≥50% and ≤90% of the popcorn fragments have a size of ≥2 mm and ≤10 mm.

3. The composite fiberboard material of claim 2, wherein ≥50% and ≤90% of the popcorn fragments have a size of ≥4 mm and ≤10 mm.

4. The composite fiberboard material of claim 3, wherein ≥70% and ≤90% of the popcorn fragments have a size of ≥4 mm and ≤10 mm.

5. The composite fiberboard material of claim 2, wherein ≥50% and ≤80% of the popcorn fragments have a size of ≥3 mm and ≤8 mm.

6. The composite fiberboard material of claim 1, wherein the popcorn fragments have an average size of ≥3 mm and ≤6 mm.

7. The composite fiberboard material of claim 6, wherein the popcorn fragments have an average size of ≥3.5 mm and ≤5 mm.

8. The composite fiberboard material of claim 1, further comprising a formaldehyde-containing resin or a polymeric diphenylmethane diisocyanate resin.

9. The composite fiberboard material of claim 1, wherein the fiberboard has a bulk density of ≤550 $kg/m^3$, and a transverse tensile strength per unit of bulk density * 1000 of ≥0.75 $m^3N/mm^2kg$.

10. A method for producing the composite fiberboard material of claim 1, the method comprising treating corn kernels so as to give popped up popcorn, milling of the popcorn into popcorn fragments, and combining the popcorn fragments with wood fibers.

11. The method of claim 10, wherein the treating step is carried out via microwave treatment.

12. The method of claim 10, wherein in the combining step, a binder and, optionally, a hardening accelerator is added.

13. The method of claim 12, wherein the binder is selected from the group consisting of urea-formaldehyde resin, melamine-formaldehyde resin, melamine-reinforced urea-formaldehyde resin, tannin-formaldehyde resin, phenol-formaldehyde resin, and polymeric diphenylmethane diisocyanate.

14. The method of claim 10, wherein the treating step includes adding ≤10% fat by weight of the corn kernels prior to popping.

15. The method of claim 14, wherein the treating step includes adding ≤5% fat by weight of the corn kernels prior to popping.

* * * * *